US012779829B2

(12) United States Patent
Suzuki et al.

(10) Patent No.: US 12,779,829 B2
(45) Date of Patent: Nov. 3, 2026

(54) MULTILAYER STRUCTURE AND MULTILAYER TUBE

(71) Applicant: KURARAY CO., LTD., Okayama (JP)

(72) Inventors: Makoto Suzuki, Kurashiki (JP); Mizuko Oshita, Kurashiki (JP)

(73) Assignee: KURARAY CO., LTD., Okayama (JP)

( * ) Notice: Subject to any disclaimer, the term of this patent is extended or adjusted under 35 U.S.C. 154(b) by 813 days.

(21) Appl. No.: 18/011,482

(22) PCT Filed: Jun. 11, 2021

(86) PCT No.: PCT/JP2021/022392
§ 371 (c)(1),
(2) Date: Dec. 19, 2022

(87) PCT Pub. No.: WO2021/261301
PCT Pub. Date: Dec. 30, 2021

(65) Prior Publication Data

US 2023/0286255 A1 Sep. 14, 2023

(30) Foreign Application Priority Data

Jun. 23, 2020 (JP) ................................ 2020-107848

(51) Int. Cl.
*B32B 27/08* (2006.01)
*B32B 27/30* (2006.01)
*B32B 27/32* (2006.01)

(52) U.S. Cl.
CPC ............ *B32B 27/306* (2013.01); *B32B 27/08* (2013.01); *B32B 27/322* (2013.01); *B32B 2250/24* (2013.01); *B32B 2274/00* (2013.01)

(58) Field of Classification Search
CPC .. B32B 1/02; B32B 1/08; B32B 27/32; B32B 27/34; Y10T 428/31855; Y10T 428/31725; Y10T 428/139; F16L 11/04
See application file for complete search history.

(56) References Cited

U.S. PATENT DOCUMENTS 5,803,131 A 9/1998 Wasa et al.
10,960,635 B1 3/2021 Tsuboi et al.
(Continued)

FOREIGN PATENT DOCUMENTS

EP 1728824 A2 12/2006
EP 1728824 A3 8/2007
(Continued)

OTHER PUBLICATIONS

International Search Report issued in corresponding International Patent Application No. PCT/JP2021/022392 dated Sep. 7, 2021.
(Continued)

*Primary Examiner* — Mark Ruthkosky
(74) *Attorney, Agent, or Firm* — Morgan, Lewis & Bockius LLP

(57) ABSTRACT

Provided are a multilayer structure and a multilayer tube which have superior gas barrier properties and in which occurrence of cracks at a time of deforming by heating is inhibited. The multilayer structure includes at least a layer (X) constituted from a resin composition (x), the resin composition (x) containing: an ethylene-vinyl alcohol copolymer (A); and an acid-modified ethylene-α-olefin copolymer (B), wherein a number of total layers of the multilayer structure is 3 or more, a total thickness of the total layers is 500 μm or more, a thickness of the layer (X) is 30 μm or more, a mass ratio (B/A) of the acid-modified ethylene-α-olefin copolymer (B) to the ethylene-vinyl alcohol copolymer (A) is 3/97 or more and 15/85 or less, and an acid value of the acid-modified ethylene-α-olefin copolymer (B) is 8.5 mg KOH/g or more and 15 mg KOH/g or less.

13 Claims, 1 Drawing Sheet

(56) References Cited

U.S. PATENT DOCUMENTS

| | | | |
|---|---|---|---|
| 2008/0023094 A1 | | 1/2008 | Sasai |
| 2008/0206471 A1 | | 8/2008 | Tomizaki et al. |
| 2021/0078283 A1 | | 3/2021 | Tsuboi et al. |

FOREIGN PATENT DOCUMENTS

| | | | | |
|---|---|---|---|---|
| EP | 1728824 | B1 | | 9/2009 |
| EP | 1728824 | B8 | | 9/2009 |
| JP | H08-91063 | A | | 4/1996 |
| JP | H11208676 | A | * | 8/1999 |
| JP | 2004122459 | A | | 4/2004 |
| JP | 2005-068300 | A | | 3/2005 |
| JP | 2005-248033 | A | | 9/2005 |
| JP | 2007-009171 | A | | 1/2007 |
| JP | 2008-030386 | A | | 2/2008 |
| JP | 2008208228 | A | | 9/2008 |
| JP | 2010-234777 | A | | 10/2010 |
| JP | 2018058943 | A | * | 4/2018 |
| JP | 2019-059059 | A | | 4/2019 |
| WO | 2019/142808 | A1 | | 7/2019 |

OTHER PUBLICATIONS

Written Opinion issued in corresponding International Patent Application No. PCT/JP2021/022392 dated Sep. 7, 2021.

* cited by examiner

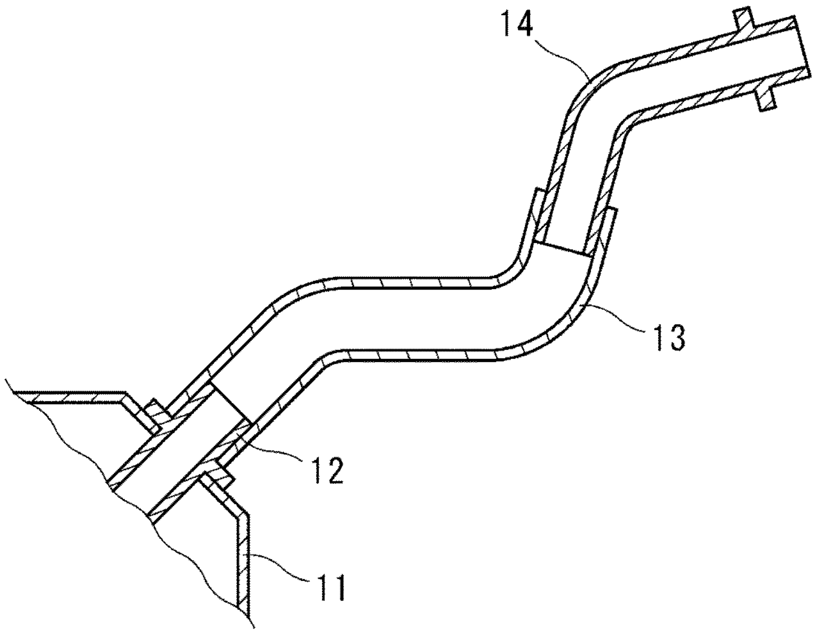
14
13
12
11

MULTILAYER STRUCTURE AND MULTILAYER TUBE

TECHNICAL FIELD

The present invention relates to a multilayer structure including at least one layer constituted from a resin composition containing: an ethylene-vinyl alcohol copolymer (hereinafter, may be abbreviated as "EVOH"); and an acid-modified ethylene-α-olefin copolymer, and to a multilayer tube including the multilayer structure.

DISCUSSION OF THE BACKGROUND

EVOHs have superior barrier properties against gases of oxygen and the like. Thus, a multilayer structure including a layer containing an EVOH is used for various purposes such as packaging materials, containers, sheets, pipes, and the like.

Owing to having high crystallinity, EVOHs are disadvantageous in being rigid and low in flexibility. Thus, various types of: resin compositions in which a resin with high flexibility is blended into an EVOH; and multilayer structures using such resin compositions have been developed. Patent Document 1 discloses inventions of: a resin composition containing an EVOH and an elastomer; and a refrigerant transporting hose including a layer formed from the resin composition. Patent Document 2 discloses inventions of: a resin composition containing an EVOH, an acid-modified ethylene-α-olefin copolymer rubber, and the like; and a fuel-based resin molded product including a layer formed from the resin composition.

Meanwhile, in recent years, due to requirements for weight reduction and the like of automobiles, automobile components have been increasingly made of resins; for example, a resin filler pipe has been considered (see Patent Document 3). Since volatile fuel such as gasoline or the like passes inside the filler pipe, superior gas barrier properties are required for the filler pipe. Thus, in the filler pipe proposed in Patent Document 3, a plating layer is provided on an inner face or an outer face of a pipe main body containing a polyolefin as a main material.

PRIOR ART DOCUMENTS

Patent Documents

Patent Document 1: Japanese Unexamined Patent Application, Publication No. 2007-9171

Patent Document 2: Japanese Unexamined Patent Application, Publication No. 2005-68300

Patent Document 3: Japanese Unexamined Patent Application, Publication No. H8-91063

SUMMARY OF THE INVENTION

Problems to be Solved by the Invention

Here, in order to improve the gas barrier properties of the resin filler pipe, thickening thereof and adopting a layer structure including such a layer containing an EVOH can be considered. On the other hand, when the resin filler pipe is bonded to an other member (for example, a metal pipe or the like), an operation may be performed in which an opening of the resin filler pipe is expanded by heating for bonding to the other member. However, in the case in which the filler pipe is thick and has the multilayer structure including the layer of the EVOH, in the operation of expanding the opening by heating, cracks originating from the layer containing the EVOH may occur. In a case, even aside from the resin filler pipe, of a thick multilayer structure including the layer containing the EVOH, cracks are likely to occur in an operation of deforming by heating.

The present invention was made in view of the foregoing circumstances, and an object of the present invention is to provide a multilayer structure and a multilayer tube which have superior gas barrier properties and in which occurrence of cracks at a time of deforming by heating is inhibited.

Means for Solving the Problems

The object of the present invention is accomplished by providing any one of the following.

(1) A multilayer structure including at least a layer (X) constituted from a resin composition (x), the resin composition (x) containing: an ethylene-vinyl alcohol copolymer (A); and an acid-modified ethylene-α-olefin copolymer (B), wherein a number of total layers of the multilayer structure is 3 or more, a total thickness of the total layers is 500 μm or more, and a thickness of the layer (X) is 30 μm or more, a mass ratio (B/A) of the acid-modified ethylene-α-olefin copolymer (B) to the ethylene-vinyl alcohol copolymer (A) is 3/97 or more and 15/85 or less, and an acid value of the acid-modified ethylene-α-olefin copolymer (B) is 8.5 mg KOH/g or more and 15 mg KOH/g or less.

(2) The multilayer structure according to (1), wherein a resin component of the resin composition (x) is constituted substantially from only the ethylene-vinyl alcohol copolymer (A) and the acid-modified ethylene-α-olefin copolymer (B).

(3) The multilayer structure according to (1) or (2), wherein an ethylene unit content of an ethylene-vinyl alcohol polymer is 15 mol % or more and 35 mol % or less.

(4) The multilayer structure according to any one of (1) to (3), wherein an α-olefin constituting the acid-modified ethylene-α-olefin copolymer (B) is 1-butene.

(5) The multilayer structure according to any one of (1) to (4), wherein the resin composition (x) further contains an antioxidant.

(6) The multilayer structure according to any one of (1) to (5), further including a layer (Y) containing at least one type of a resin selected from the group consisting of a polyamide, an ethylene-tetrafluoroethylene copolymer, and polyethylene.

(7) A multilayer tube including the multilayer structure according to any one of (1) to (6).

(8) A multilayer tube including the multilayer structure according to (6), wherein the layer (Y) is an innermost layer.

(9) The multilayer tube according to (7) or (8), wherein the multilayer tube is for use in an automobile component.

Effects of the Invention

According to the present invention, a multilayer structure and a multilayer tube which have superior gas barrier properties and in which occurrence of cracks at a time of deforming by heating is inhibited can be provided.

BRIEF DESCRIPTION OF THE DRAWINGS

FIG. 1 shows a schematic cross-sectional view illustrating a piping structure including a filler pipe (multilayer tube) according to an embodiment of the present invention.

DESCRIPTION OF EMBODIMENTS

Multilayer Structure

A multilayer structure of the present invention includes at least a layer (X) constituted from a resin composition (x), the resin composition (x) containing: an ethylene-vinyl alcohol copolymer (A) (hereinafter, may be abbreviated as "EVOH (A)"); and an acid-modified ethylene-α-olefin copolymer (B) (hereinafter, may be abbreviated as "polymer (B)"), wherein a number of total layers of the multilayer structure is 3 or more, a total thickness of the total layers is 500 μm or more, a thickness of the layer (X) is 30 μm or more, a mass ratio (B/A) of the polymer (B) to the EVOH (A) is 3/97 or more and 15/85 or less, and an acid value of the polymer (B) is 8.5 mg KOH/g or more and 15 mg KOH/g or less.

Since the layer (X) contains a sufficient amount of the EVOH (A), and the thickness of the layer (X) and the total thickness of the total layers are great, the multilayer structure of the present invention has superior gas barrier properties. Moreover, in the multilayer structure, the layer (X) contains the polymer (B) as well as the EVOH (A) in appropriate proportions, the polymer (B) having the acid value within the predetermined range, and thus, occurrence of cracks at a time of deforming by heating is inhibited. It is to be noted that hereinafter, a property of inhibiting occurrence of cracks at the time of deforming by heating may be simply referred to as "crack resistance".

In the present invention, a thickness means an average value (average thickness) of measurement values measured at 5 arbitrary points.

Layer (X)

The layer (X) is constituted from the resin composition (x) containing the EVOH (A) and the polymer (B).

In light of the gas barrier properties, the thickness of the layer (X) is 30 μm or more, preferably 50 μm or more, more preferably 70 μm or more, and still more preferably 100 μm or more. Furthermore, in light of the crack resistance, flex resistance, and the like, the thickness of the layer (X) is preferably 1,000 μm or less, more preferably 500 μm or less, still more preferably 300 μm or less, and particularly preferably 200 μm or less. The thickness of the layer (X) as referred to herein means a total of thicknesses of all layers (X) included in the multilayer structure of the present invention.

It is only necessary that at least one layer (X) is included in the multilayer structure of the present invention; in a case in which the multilayer structure of the present invention includes a plurality of layers (X), compositions, thicknesses, and the like of the respective layers (X) may be the same or different. The upper limit of a number of layers (X) included in the multilayer structure of the present invention may be, for example, 40, 10, or 3. It may be preferred that the multilayer structure of the present invention includes one layer (X).

In light of the gas barrier properties, a thickness per layer (X) is preferably 15 μm or more, more preferably 30 μm or more, still more preferably 50 μm or more, and yet more preferably 70 μm or more or 100 μm or more. Furthermore, in light of the crack resistance and the like, the thickness per layer (X) is preferably 1,000 μm or less, more preferably 500 μm or less, still more preferably 300 μm or less, and particularly preferably 200 μm or less.

A proportion of the thickness of the layer (X) with respect to a thickness of the multilayer structure of the present invention (total thickness of the total layers constituting the multilayer structure of the present invention) is preferably 1% or more, more preferably 5% or more, and still more preferably 10% or more. Furthermore, the proportion of the thickness of the layer (X) is preferably 30% or less, and more preferably 20% or less. When the proportion of the thickness of the layer (X) falls within the above range, there is a tendency for the gas barrier properties, the crack resistance, melt moldability, and the like to be improved.

EVOH (A)

When the resin composition (x) contains the EVOH (A), the gas barrier properties of the layer (X), and furthermore, of the multilayer structure of the present invention become favorable.

The EVOH (A) can be typically obtained by saponifying an ethylene-vinyl ester copolymer. The production and saponification of the ethylene-vinyl ester copolymer may be performed by well-known methods. The vinyl ester is typified by vinyl acetate, but may be another fatty acid vinyl ester such as vinyl formate, vinyl propionate, vinyl valerate, vinyl caprate, vinyl laurate, vinyl stearate, vinyl pivalate, vinyl versatate, or the like.

An ethylene unit content of the EVOH (A) may be 10 mol % or more and is preferably 15 mol % or more, more preferably 20 mol % or more, and still more preferably 24 mol % or more. Furthermore, the ethylene unit content of the EVOH (A) may be 50 mol % or less and is preferably 35 mol % or less, more preferably 32 mol % or less, and still more preferably 30 mol % or less. By thus using the EVOH (A) having a relatively low ethylene unit content, particularly superior gas barrier properties can be exhibited. On the other hand, in the case in which the ethylene unit content of the EVOH (A) is relatively low, there is a tendency for rigidity to increase, whereby cracks are likely to occur at the time of deforming by heating; therefore, advantages of applying the present invention are increased. That is to say, the present invention can solve the problem that particularly significantly occurs in the case of using the EVOH (A) having a relatively low ethylene unit content. The ethylene unit content of the EVOH (A) can be determined by a nuclear magnetic resonance (NMR) method.

A degree of saponification of a vinyl ester component of the EVOH (A) is preferably 80 mol % or more, more preferably 90 mol % or more, and still more preferably 99 mol % or more. By setting the degree of saponification to 90 mol % or more, for example, the gas barrier properties can be improved. Furthermore, the degree of saponification of the EVOH (A) may be 100 mol % or less and may be 99.99 mol % or less. The degree of saponification of the EVOH (A) can be calculated by performing an $^1$H-NMR measurement to measure a peak area of hydrogen atoms contained in a vinyl ester structure, and a peak area of hydrogen atoms contained in a vinyl alcohol structure. When the degree of saponification of the EVOH (A) falls within the above range, favorable gas barrier properties tend to be obtained.

Furthermore, the EVOH (A) may have, within a range not hindering the object of the present invention, a unit derived from a monomer other than the ethylene, the vinyl ester, and a saponification product thereof. In the case in which the EVOH (A) has the other monomer unit, a content of the other monomer unit with respect to total monomer units (structural units) of the EVOH (A) is preferably 30 mol % or less, more preferably 20 mol % or less, still more preferably 10 mol % or less, and particularly preferably 5 mol % or less. Furthermore, in the case in which the EVOH (A) has the unit derived from the other monomer, the lower limit value of the content thereof may be 0.05 mol % and may be 0.10 mol %. Examples of the other monomer include: alkenes such as propylene, butylene, pentene, and hexene; unsaturated acids such as acrylic acid, methacrylic acid, crotonic acid, and itaconic acid, or anhydrides, salts, mono- or dialkyl esters, or the like thereof; nitriles such as acrylonitrile and methacrylonitrile; amides such as acrylamide and methacrylamide; olefin sulfonic acids such as vinylsulfonic acid, allylsulfonic acid, and methallylsulfonic acid, or salts thereof; vinyl silane compounds such as vinyltrimethoxysilane, vinyltriethoxysilane, vinyl tris(β-methoxy-ethoxy)silane, and γ-methacryloxypropyl methoxysilane; alkyl vinyl ethers; vinyl ketone; N-vinylpyrrolidone; vinyl chloride; vinylidene chloride; and the like.

The EVOH (A) may be an EVOH modified after being subjected to a method such as urethanization, acetalization, cyanoethylation, oxyalkylenation, or the like.

The EVOH (A) may be used alone of one type, or a mixture of two or more types of EVOHs which differ in the ethylene unit content, the degree of saponification, the copolymer component, the presence or absence of modification, the type of modification, and/or the like may be used.

An MFR of the EVOH (A) at 230° C. under a load of 2,160 g is preferably 0.1 g/10 min or more, more preferably 0.5 g/10 min or more, and still more preferably 1 g/10 min or more. On the other hand, the MFR of the EVOH (A) is preferably 50 g/10 min or less, more preferably 20 g/10 min or less, and still more preferably 5 g/10 min or less. By setting the MFR of the EVOH (A) to a value within the above range, melt kneadability and melt moldability of the resin composition to be obtained are improved.

Acid-Modified Ethylene-α-Olefin Copolymer (B)

The acid-modified ethylene-α-olefin copolymer (B) is an ethylene-α-olefin copolymer having an acid group. The acid-modified ethylene-α-olefin copolymer (B) is typically a modified ethylene-α-olefin copolymer obtained by chemical bonding of an unsaturated carboxylic acid, an anhydride thereof, etc. to an ethylene-α-olefin copolymer by an addition reaction, a graft reaction, or the like. When the resin composition (x) contains the polymer (B), occurrence of cracks at the time of deforming by heating is inhibited. Examples of an acid modifier include unsaturated carboxylic acids and anhydrides thereof such as maleic acid, acrylic acid, itaconic acid, crotonic acid, maleic anhydride, and itaconic anhydride, and in light of reactivity with the EVOH (A), maleic anhydride is preferred.

The polymer (B) is typically based on a copolymer having a monomer unit derived from ethylene and a monomer unit derived from an α-olefin having 3 to 20 carbon atoms. Examples of the α-olefin having 3 to 20 carbon atoms include propylene, 1-butene, 4-methyl-1-pentene, 1-hexene, 1-octene, 1-decene, and the like. Of these, 1-butene and 1-hexene are preferred, and 1-butene is more preferred. In a case in which the α-olefin constituting the polymer (B) is a butene, occurrence of cracks at the time of deforming by heating is further inhibited. Furthermore, the α-olefin having 3 to 20 carbon atoms may be used alone, or two or more types thereof may be used together.

A content of the monomer unit derived from the ethylene in the polymer (B) with respect to a total mass (100% by mass) of the ethylene-α-olefin copolymer is typically 50% by mass or more. A content of the monomer unit derived from the α-olefin having 3 to 20 carbon atoms with respect to the total mass (100% by mass) of the ethylene-α-olefin copolymer is typically 50% by mass or less.

The polymer (B) may have, in addition to the monomer unit derived from the ethylene and the monomer unit derived from the α-olefin having 3 to 20 carbon atoms, within a range not leading to impairment of the effects of the present invention, a monomer unit derived from a monomer other than the ethylene and the α-olefin having 3 to 20 carbon atoms, and examples of the other monomer include: conjugated dienes such as 1,3-butadiene and 2-methyl-1,3-butadiene; non-conjugated dienes such as 1,4-pentadiene and 1,5-hexadiene; unsaturated carboxylic acids such as acrylic acid and methacrylic acid; unsaturated carboxylic acid esters such as methyl acrylate, ethyl acrylate, butyl acrylate, methyl methacrylate, and ethyl methacrylate; vinyl ester compounds such as vinyl acetate; and the like.

Examples of the polymer (B) include acid-modified products of copolymers such as an ethylene-propylene copolymer, an ethylene-1-butene copolymer, an ethylene-1-hexene copolymer, an ethylene-4-methyl-1-pentene copolymer, an ethylene-1-octene copolymer, an ethylene-1-butene-1-hexene copolymer, an ethylene-1-butene-4-methyl-1-pentene copolymer, and an ethylene-1-butene-1-octene copolymer. Of these, in light of the crack resistance of the multilayer structure to be obtained, an acid-modified ethylene-1-butene copolymer and an acid-modified ethylene-propylene copolymer are preferred, and an acid-modified ethylene-1-butene copolymer is more preferred.

In light of the crack resistance of the layer (X), and furthermore, of the multilayer structure of the present invention, the acid value of the polymer (B) is 8.5 mg KOH/g or more, preferably 10 mg KOH/g or more, and more preferably 11 mg KOH/g or more. Furthermore, in light of the crack resistance, the acid value of the polymer (B) is 15 mg KOH/g or less, and preferably 13 mg KOH/g or less. The acid value of the polymer (B) as referred to herein means a value measured according to the disclosure of JIS K 2501: 2003 by using xylene as a solvent.

In light of improving the crack resistance and the like, an MFR of the polymer (B) at 230° C. under a load of 2,160 g is preferably 0.1 g/10 min or more, more preferably 0.5 g/10 min or more, and still more preferably 1.0 g/10 min or more. On the other hand, in light of improving the crack resistance and the like, the MFR of the polymer (B) is preferably 10 g/10 min or less, more preferably 7 g/10 min or less, and still more preferably 5 g/10 min or less.

The polymer (B) may be used alone of one type, or two or more types thereof may be used together.

Resin Composition (x)

The mass ratio (B/A) of the polymer (B) to the EVOH (A) in the resin composition (x) is 3/97 or more and 15/85 or less. The mass ratio (B/A) is preferably 5/95 or more, more preferably 7/93 or more, and still more preferably 9/91 or more. Furthermore, the mass ratio (B/A) is preferably 13/87 or less, and more preferably 11/89 or less. When the mass ratio (B/A) is less than 3/97, the crack resistance decreases. Furthermore, when the mass ratio (B/A) is more than 15/85, the gas barrier properties deteriorate.

A resin component of the resin composition (x) is preferably constituted substantially from only the EVOH (A) and the polymer (B). In such a case, the gas barrier properties and the crack resistance are further improved. The resin composition (x) in which the resin component is constituted substantially from only the EVOH (A) and the polymer (B) means that the resin composition (x) may contain other resin component(s) within a range not leading to impairment of the effects of the present invention. The resin component may be a component being a polymer having one type or a plurality of types of monomer units (structural units). The resin component may be, for example, a component being a compound (high molecule) having a molecular weight of 1,000 or more or 3,000 or more. A total content of the EVOH (A) and the polymer (B) with respect to the resin component of the resin composition (x) is preferably 95% by mass or more, more preferably 97% by mass or more, still more preferably 99% by mass or more, and particularly preferably 99.9% by mass or more.

A content of the resin component with respect to the resin composition (x) is preferably 95% by mass or more, more preferably 97% by mass or more, and still more preferably 99% by mass or more. Furthermore, the content of the EVOH (A) and the polymer (B) in the resin composition (x) is also preferably 95% by mass or more, more preferably 97% by mass or more, and still more preferably 99% by mass or more.

An MFR of the resin composition (x) at 210° C. under a load of 2,160 g, the MFR being measured according to JIS K 7210: 2014, is preferably 1.2 g/10 min or more, more preferably 1.5 g/10 min or more, and still more preferably 2.0 g/10 min or more. On the other hand, the MFR of the resin composition (x) at 210° C. under the load of 2,160 g is preferably 10 g/10 min or less, and more preferably 5 g/10 min or less.

In light of obtaining favorable appearance, crack resistance, and the like, an absolute value of a difference between the MFR of the EVOH (A) at 210° C. under the load of 2,160 g, the MFR being measured according to JIS K 7210: 2014, and the MFR of the polymer (B) at 210° C. under the load of 2,160 g, the MFR being measured according to JIS K 7210: 2014, is preferably 10 g/10 min or less, more preferably 7 g/10 min or less, and still more preferably 4 g/10 min or less.

Other Component(s)

The resin composition (x) may contain, within a range not hindering the effects of the present invention, other component(s) (component(s) other than the EVOH (A) and the polymer (B)) such as: a resin other than the EVOH (A) and the polymer (B); a carboxylic acid compound; a phosphoric acid compound; a boron compound; a metal salt; a stabilizer; an antioxidant; an ultraviolet ray-absorbing agent; a plasticizer; an antistatic agent; a lubricant; a colorant; a filler; a desiccant; a reinforcing agent such as various types of fibers; and the like.

Examples of the resin other than the EVOH (A) and the polymer (B) include: unmodified polyolefins such as unmodified polyethylene, unmodified polypropylene, and unmodified ethylene-α-olefin copolymers; polyamides; polyvinyl chlorides; polyvinylidene chlorides; polyesters; polystyrenes; epoxy resins; acrylic resins; urethane resins; polyester resins; and the like. Of these, in light of superior compatibility with the polymer (B), unmodified polyolefins are preferred, and unmodified ethylene-α-olefin copolymers are more preferred. In the case in which the resin composition (x) contains the resin other than the EVOH (A) and the polymer (B), in light of not hindering the effects of the present invention, a content of the resin other than the EVOH (A) and the polymer (B) is preferably 5% by mass or less, more preferably 3% by mass or less, still more preferably 1% by mass or less, and particularly preferably 0.1% by mass or less. A mode may be employed in which the resin composition (x) does not contain the resin other than the EVOH (A) and the polymer (B).

When the resin composition (x) contains a carboxylic acid compound, there is a tendency to enable inhibiting coloring at a time of melt molding. The carboxylic acid contained in the resin composition (x) may be a monocarboxylic acid, a polyvalent carboxylic acid, or a combination thereof. The carboxylic acid contained in the resin composition (x) may be an ion, and such a carboxylic acid ion may form a salt together with a metal ion.

When the resin composition (x) contains a phosphoric acid compound, there is a tendency to enable inhibiting coloring at the time of melt molding. The phosphoric acid compound contained in the resin composition (x) is not particularly limited, and various types of acids such as phosphoric acid and phosphorous acid, salts thereof, and the like may be used. A phosphate may be contained in any form of a primary phosphate, a secondary phosphate, or a tertiary phosphate, and a primary phosphate is preferred. A cationic species thereof is not particularly limited, and alkali metal salts are preferred. Of these, sodium dihydrogen phosphate and potassium dihydrogen phosphate are preferred. In the case in which the resin composition (x) contains the phosphoric acid compound, a content of the phosphoric acid compound is preferably 5 ppm or more and 200 ppm or less in terms of phosphoric acid radical. When the content of the phosphoric acid compound is 5 ppm or more, there is a tendency for coloring resistance at the time of melt molding to become favorable. On the other hand, when the content of the phosphoric acid compound is 200 ppm or less, there is a tendency for the melt moldability to become favorable, and 160 ppm or less is more suitable. It is to be noted that ppm as referred to herein represents a content based on mass.

When the resin composition (x) contains a boron compound, there is a tendency to enable inhibiting torque fluctuations at a time of heating and melting. The boron compound contained in the resin composition (x) is not particularly limited and is exemplified by a boric acid, a boric acid ester, a boric acid salt, a boron hydride, and the like. Specifically, examples of the boric acid include orthoboric acid, metaboric acid, tetraboric acid, and the like; examples of the boric acid ester include triethyl borate, trimethyl borate, and the like; and examples of the boric acid salt include alkali metal salts and alkaline earth metal salts of the above-mentioned various types of boric acids, borax, and the like. Of these, orthoboric acid (hereinafter, may be simply referred to as boric acid) is preferred. In the case in which the resin composition (x) contains the boron compound, a content of the boron compound is preferably 20 ppm or more and 2,000 ppm or less in terms of boron element equivalent. When the content of the boron compound is 20 ppm or more, there is a tendency to enable inhibiting torque fluctuations at the time of heating and melting, and 50 ppm or more is more suitable. On the other hand, when the content of the boron compound is 2,000 ppm or less, there is a tendency to enable keeping the moldability favorable, and 1,000 ppm or less is more suitable.

When the resin composition (x) contains an alkali metal salt, there is a tendency for interlayer adhesiveness between the layer (X) and another resin layer to become favorable in the multilayer structure including the layer (X) constituted from the resin composition (x). A cationic species of the alkali metal salt is not particularly limited, and a sodium salt or a potassium salt is suitable. An anionic species of the alkali metal salt is not particularly limited, either. The anionic species may be added as a carboxylic acid salt, a carbonate, a hydrogen carbonate, a phosphate, a hydrogen phosphate salt, a boric acid salt, a hydroxide, or the like. In the case in which the resin composition (x) contains the alkali metal salt, a content of the alkali metal salt is preferably 10 ppm or more and 500 ppm or less in terms of metal element equivalent. When the content of the alkali metal salt is 10 ppm or more, the interlayer adhesiveness tends to become favorable, and 50 ppm or more is more suitable. On the other hand, when the content of the alkali metal salt is 500 ppm or less, superior melt stability tends to be obtained, and 300 ppm or less is more suitable.

When the resin composition (x) contains an alkaline earth metal salt, there is a tendency to enable inhibiting deterioration and generation of defects such as gels and the like at a time of repeating melt molding of the multilayer structure. A cationic species of the alkaline earth metal salt is not particularly limited, and a magnesium salt or a calcium salt is suitable. An anionic species of the alkaline earth metal salt is not particularly limited, either. The anionic species may be added as a carboxylic acid salt, a carbonate, a hydrogen carbonate, a phosphate, a hydrogen phosphate salt, a boric acid salt, a hydroxide, or the like.

When the resin composition (x) contains an antioxidant, deterioration is inhibited, and the gas barrier properties, the crack resistance, and the like of the multilayer structure are further improved. As the antioxidant, compounds having a hindered phenol group, compounds having a hindered amine group, and other well-known antioxidants may be used. Specific examples of the antioxidant include 2,5-di-t-butylhydroquinone, 2,6-di-t-butyl-p-cresol, 4,4'-thiobis-(6-t-butylphenol), 2,2'-methylene-bis-(4-methyl-6-t-butylphenol), octadecyl-3-(3',5'-di-t-butyl-4'-hydroxyphenyl) propionate, 4,4'-thiobis-(6-t-butylphenol), pentaerythritol tetrakis[3-(3,5-di-tert-butyl-4-hydroxyphenyl)propionate], N,N'-hexane-1,6-diylbis[3-(3,5-di-tert-butyl-4-hydroxyphenyl)propionamide], and the like. Aside from these, antioxidants disclosed in paragraphs [0029] and [0033] to [0035] of Japanese Unexamined Patent Application, Publication No. 2015-27813 can also be suitably used. A content of the antioxidant in the resin composition (x) is, for example, preferably 0.001% by mass or more and 4% by mass or less, more preferably 0.01% by mass or more and 2% by mass or less, and still more preferably 0.1% by mass or more and 1% by mass or less.

A stabilizer for improving the melt stability and the like is exemplified by hydrotalcite compounds, hindered phenol or hindered amine heat stabilizers, metal salts of higher aliphatic carboxylic acids (for example, calcium stearate, magnesium stearate, etc.), and the like; in the case in which the resin composition (x) contains the stabilizer, a content thereof in the resin composition (x) may be 0.001% by mass or more and 1% by mass or less.

Examples of the ultraviolet ray-absorbing agent include ethylene-2-cyano-3',3'-diphenyl acrylate, 2-(2'-hydroxy-5'-methylphenyl)benzotriazole, 2-(2'-hydroxy-3'-t-butyl-5'-methylphenyl)5-chlorobenzotriazole, 2-hydroxy-4-methoxybenzophenone, 2,2'-dihydroxy-4-methoxybenzophenone, and the like.

Examples of the plasticizer include dimethyl phthalate, diethyl phthalate, dioctyl phthalate, waxes, liquid paraffin, phosphoric acid esters, and the like. Examples of the antistatic agent include pentaerythritol monostearate, sorbitan monopalmitate, sulfated polyolefins, polyethylene oxide, carbowax, and the like. Examples of the lubricant include ethylene bisstearamide, butyl stearate, and the like. Examples of the colorant include carbon black, phthalocyanine, quinacridone, indoline, azo pigments, bengara, and the like. Examples of the filler include glass fiber, asbestos, ballastite, calcium silicate, and the like.

A method for producing the resin composition (x) is not particularly limited, and the resin composition (x) can be produced, for example, by mixing or kneading the EVOH (A) and the polymer (B) under melt conditions. The mixing or kneading under the melt conditions can be performed using, for example, a known mixing apparatus or kneading apparatus such as a kneader ruder, an extruder, a mixing roll, a Banbury mixer, or the like. A temperature during the mixing or kneading may be appropriately adjusted in accordance with a melting point of the EVOH (A) to be used, etc., and typically, a temperature within a temperature range of 160° C. or more and 300° C. or less may be employed.

Layer (Y)

The multilayer structure of the present invention preferably further includes a layer other than the layer (X). The layer other than the layer (X) is exemplified by a resin layer formed from a resin or resin composition other than the resin composition (x), and is preferably a layer containing a thermoplastic resin, and more preferably a layer (Y) containing at least one type of a resin selected from the group consisting of a polyamide, an ethylene-tetrafluoroethylene copolymer, and polyethylene. When the multilayer structure thus includes the layer (Y), the crack resistance, durability, and the like are improved.

In the layer (Y), a proportion accounted for by the at least one type of the resin selected from the group consisting of a polyamide, an ethylene-tetrafluoroethylene copolymer, and polyethylene is preferably 50% by mass or more, more preferably 70% by mass or more, still more preferably 90% by mass or more, and particularly preferably 95% by mass or more, and may be 100% by mass. That is to say, the layer (Y) may be constituted substantially from only the at least one type of the resin selected from the group consisting of a polyamide, an ethylene-tetrafluoroethylene copolymer, and polyethylene.

In light of the durability, the crack resistance, and the like, the layer (Y) is preferably disposed on each face side of the layer (X). The layer (Y) may be directly laminated on a surface of the layer (X), or may be laminated with another layer (for example, an adhesive resin layer or the like) interposed therebetween.

In light of the crack resistance and the like, a thickness of the layer (Y) is preferably 200 μm or more, more preferably 400 μm or more, still more preferably 600 μm or more, and particularly preferably 800 μm or more. Furthermore, in light of processability, weight reduction, and the like, the thickness of the layer (Y) is preferably 3,000 μm or less, more preferably 2,000 μm or less, and still more preferably 1,400 μm or less. The thickness of the layer (Y) as referred to herein means a total of thicknesses of all layers (Y) included in the multilayer structure of the present invention.

In the case in which the multilayer structure of the present invention includes two or more layers (Y), compositions, thicknesses, and the like of the respective layers (Y) may be the same or different. The upper limit of a number of layers (Y) included in the multilayer structure of the present invention may be, for example, 41, 11, or 4. It may be preferred that the multilayer structure of the present invention includes two layers (X).

In light of the crack resistance and the like, a thickness per layer (Y) is preferably 100 μm or more, more preferably 200 μm or more, still more preferably 300 μm or more, and particularly preferably 400 μm or more. Furthermore, in light of the processability, weight reduction, and the like, the thickness per layer (Y) is preferably 1,500 μm or less, more preferably 1,000 μm or less, and still more preferably 700 μm or less.

Multilayer Structure

A layer configuration of the multilayer structure of the present invention is not particularly limited, as long as at least one layer (X) is included and the number of the total layers is 3 or more; in a case in which the layer (X) is denoted by X, the layer (Y) is denoted by Y, and an adhesive resin layer is denoted by Ad, examples of the layer configuration include Y/X/Y, Y/X/Ad/Y, Y/Ad/X/Ad/Y, Y/Ad/Y/X/Y/Ad/Y, Y/X/Y/X/Y, and the like. Furthermore, the multilayer structure of the present invention may further include other layer(s) aside from the layer (X), the layer (Y), and the adhesive resin layer.

The lower limit of the number of the total layers constituting the multilayer structure of the present invention is 3, and may be 5. On the other hand, the upper limit of the number of the total layers may be, for example, 100, and may be 40, 20, 10, 5, or 3.

The total thickness of the total layers of the multilayer structure of the present invention, i.e., the thickness of the multilayer structure of the present invention is 500 μm or more, preferably 610 μm or more, more preferably 650 μm or more, and still more preferably 800 μm or more. When the total thickness of the total layers is greater than or equal to the lower limit, superior gas barrier properties can be exhibited. On the other hand, in light of the processability, weight reduction, and the like, the total thickness of the total layers of the multilayer structure is preferably 3,000 μm or less, more preferably 2,000 μm or less, and still more preferably 1,500 μm or less.

A method for producing the multilayer structure of the present invention is not particularly limited, and for example, a well-known method such as extrusion coating, coextrusion, coinjection, or laminating may be used; the adhesive resin layer may be provided between the layer (X) and the layer (Y).

The adhesive resin is not particularly limited as long as it has adhesiveness with the layer (X) and the layer (Y), and a carboxylic acid-modified adhesive resin, specifically, an adhesive resin containing a carboxyl group to which an ethylenic unsaturated carboxylic acid or an ester or anhydride thereof is chemically bonded is preferred. As such an adhesive resin, unsaturated carboxylic acid-modified products such as ethylene-vinyl acetate copolymers and ethylene-ethyl acrylate copolymers are preferred.

An average thickness of one adhesive resin layer may be, for example, 1 μm or more and 200 μm or less, and is preferably 3 μm or more and 100 μm or less.

The multilayer structure of the present invention has superior gas barrier properties, whereby occurrence of cracks at the time of deforming by heating is inhibited. Thus, the multilayer structure is suitably used as various types of containers, tubes (pipes and tubes), packaging materials, and the like. A shape of the multilayer structure is not particularly limited, either, and various shapes such as a sheet shape, a tube shape, and a bag shape may be employed.

Multilayer Tube

A multilayer tube of the present invention is a multilayer tube including the above-described multilayer structure of the present invention. That is to say, the multilayer tube of the present invention is a tube-shaped multilayer structure. A specific and suitable configuration of each layer of the multilayer tube, a thickness of each layer, and the like are the same as those of the above-described multilayer structure. The multilayer tube may be also referred to as "multilayer pipe", "multilayer tube", or the like.

The multilayer tube of the present invention preferably includes the layer (Y) as well as the layer (X), and the layer (Y) is preferably an innermost layer. When the layer (Y) is the innermost layer, deterioration of the layer (X) can be inhibited, the crack resistance and the like can be improved, and the gas barrier properties can also be maintained for a long period of time. It is preferred that in the multilayer tube, an outermost layer is also the layer (Y). Examples of a specific layer configuration of the multilayer tube include (inside) Y/X/Y (outside), (inside) Y/X/Ad/Y (outside), (inside) Y/Ad/X/Ad/Y (outside), (inside) Y/Ad/Y/X/Y/Ad/Y (outside), (inside) Y/X/Y/X/Y (outside), and the like.

A method for producing the multilayer tube of the present invention is not particularly limited, and a conventional well-known method such as coextrusion or the like may be employed as in the case of the method for producing the above-described multilayer structure. Furthermore, the multilayer structure of the present invention can also be produced, for example, by subjecting an outer face of a monolayer pipe including the layer (Y) to coextrusion coating of the adhesive resin and the resin composition (x).

The multilayer tube of the present invention is suitably used for an automobile component. The multilayer tube for use for an automobile component is exemplified by a filler pipe and the like. The multilayer tube of the present invention is superior in gas barrier properties, and even in a case in which an opening is expanded by heating at a time of mounting, cracks are less likely to occur. Thus, the multilayer tube is suitable as a material of an automobile component for which superior barrier properties against volatile gases are required.

Hereinafter, a filler pipe (may be also referred to as "filler tube", "filler hose", or the like) which is an example of the multilayer tube used for an automobile component is described. FIG. 1 is the schematic cross-sectional view illustrating a piping structure for supplying gasoline fuel to a fuel tank 11 of an automobile. One tip of a filler pipe 13 is attached to a mounting pipe 12 with which the fuel tank 11 is provided. An other tip of the filler pipe 13 is attached to an end of a fuel filler pipe 14. As the filler pipe 13, the multilayer tube of the present invention is used. Typically, the fuel filler pipe 14 is made of a metal, and the filler pipe 13 can be connected to the fuel filler pipe 14 by heating the other tip (opening) of the filler pipe 13 and expanding the opening in a state of having increased flexibility. The filler pipe 13 and the mounting pipe 12 may be connected in a similar manner. Furthermore, the multilayer tube of the present invention may be used for the mounting pipe 12 and the fuel filler pipe 14, and the multilayer structure of the present invention may be used for the fuel tank 11.

EXAMPLES

Hereinafter, the present invention is described further in detail by way of Examples, but the present invention is not limited to the Examples.

Materials used in Examples and Comparative Examples

EVOH (A) and the like

A-1: "EVAL (registered trademark) L171B" (EVOH, manufactured by Kuraray Co., Ltd.; ethylene unit content: 27 mol %)

a-1: "Vestamid L2140" (polyamide (PA), manufactured by Evonik)

a-2: "Fluon C-8015X" (ethylene-tetrafluoroethylene copolymer (ETFE), manufactured by AGC)

Acid-modified ethylene-α-olefin copolymer (B) and the like

B-1: "TAFMER (registered trademark) MH7020" (maleic anhydride-modified ethylene-1-butene copolymer, manufactured by Mitsui Chemicals, Inc.; acid value: 12 mg KOH/g)

B-2: "TAFMER (registered trademark) MP0620" (maleic anhydride-modified ethylene-propylene copolymer, manufactured by Mitsui Chemicals, Inc.; acid value: 12 mg KOH/g)

b-1: "TAFMER (registered trademark) MH7010" (maleic anhydride-modified ethylene-1-butene copolymer, manufactured by Mitsui Chemicals, Inc.; acid value: 6 mg KOH/g)

b-2: "TAFMER (registered trademark) A1050" (ethylene-1-butene copolymer, manufactured by Mitsui Chemicals, Inc.)

b-3: "Fusabond (registered trademark) M603" (acid-modified ethylene-α-olefin copolymer, manufactured by Du pont; acid value: 42 mg KOH/g)

The acid value of the acid-modified ethylene-α-olefin copolymer (B) was measured according to the disclosure of JIS K 2501: 2003, by using xylene as a solvent.

Example 1

(1) Production of Resin Composition

Resin composition pellets (resin composition (x)) were obtained by dry-blending: 90 parts by mass of (A-1) as the ethylene-vinyl alcohol copolymer (A); 10 parts by mass of (B-1) as the acid-modified ethylene-α-olefin copolymer (B); and 0.25 parts by mass of pentaerythritol tetrakis[3-(3,5-di-tert-butyl-4-hydroxyphenyl)propionate] ("IRGANOX 1010", manufactured by BASF) and 0.25 parts by mass of N,N'-hexane-1,6-diylbis[3-(3,5-di-tert-butyl-4-hydroxyphenyl)propionamide] ("IRGANOX 1098", manufactured by BASF) as an antioxidant, extruding using a 30 mmφ twin-screw extruder ("TEX-30SS-30CRW-2V", manufactured by The Japan Steel Works, Ltd.) under conditions involving a temperature of 220° C., a screw rotation speed of 200 rpm, and an extruded resin amount of 25 kg/hr, and then, after pelletizing, drying at 30° C. for 16 hrs under reduced pressure.

(2) Production of Monolayer Film

Monolayer films constituted from the resin composition pellets obtained in (1) above and having thicknesses of 20 μm, 50 μm, 100 μm, and 150 μm, respectively, were formed using a single-screw extruder ("D2020", manufactured by Toyo Seiki Seisaku-sho, Ltd.; D (mm)=20; L/D=20; compression ratio=3.0; screw: full flight). It is to be noted that film formation conditions were as shown in Table 1. Furthermore, extrusion conditions were as shown below.

Extrusion Conditions

Extrusion temperature: 220° C.

Die width: 30 cm

Temperature of drawing roll: 80° C.

TABLE

| | Thickness (μm) | | | |
|---|---|---|---|---|
| | 20 | 50 | 100 | 150 |
| Screw rotation speed (rpm) | 45 | 50 | 100 | 150 |
| Speed of roll drawing (m/min) | 2.5 | 1.25 | 1.25 | 1.25 |

(3) Oxygen Transmission Rate (OTR)

The monolayer film having the thickness of 20 μm, obtained in (2) above, was conditioned under a condition of 20° C./65% RH, and then an oxygen transmission rate (OTR) was measured using an oxygen transmission rate measurement device ("OX-Tran 2/20", manufactured by Modern Controls. Inc.) under the condition of 20° C./65% RH. The results are shown in Table 2.

(4) Yield Stress and Residual Stress

Each of the monolayer films having the thicknesses of 50 μm, 100 μm, and 150 μm, obtained in (2) above, was cut into a short strip with a width of 15 mm, and stretched by 20% from an interval between chucks of 50 mm in an MD direction at a tensile speed of 50 mm/min, by using a "universal testing system 3367" (manufactured by Instron Japan Company Limited). A stress at an obtained yield point was defined as a yield stress. Furthermore, a stress obtained by maintaining the state after the stretching by 20% for 15 sec was defined as a residual stress. The measurement results are shown in Table 2.

(5) Production of Multilayer Structure (Multilayer Sheet)

A multilayer structure of 3 layers involving 2 types (layer (Y)/layer (X)/layer (Y)=PA/EVOH/PA=thickness 425 μm/150 μm/425 μm; total thickness of the total layers: 1,000 μm) was obtained using the resin composition pellets obtained in (1) above and the PA (a-1), under the following conditions.

Extruder:

Layer (X) 20 mmφ) extruder, ME-type CO-EXT extruder for laboratory use (manufactured by Toyo Seiki Seisaku-sho, Ltd.)

Layer (Y) 32 mmφ) extruder, GT-32-A (manufactured by Research Laboratory of Plastics Technology Co., Ltd.)

EVOH Extrusion Temperature:

Supply unit/compression unit/metering unit/die=170/210/220/220° C.

Extrusion Temperature for Outer Layer:

Supply unit/compression unit/metering unit/die=170/210/230/230° C.

Die:

300 mm width coat hanger die (manufactured by Research Laboratory of Plastics Technology Co., Ltd.)

(6) Oxygen Transmission Rate (OTR)

The multilayer structure obtained in (5) above was conditioned under a condition of 20° C./65% RH, and then the oxygen transmission rate (OTR) was measured using the same oxygen transmission rate measurement device as in (3) above under the condition of 20° C./65% RH. The results are shown in Table 2.

(7) Presence or Absence of Cracks

The multilayer structure having the thickness of 1,000 μm, obtained in (5) above, was conditioned under a condition of 20° C./65% RH, and then cut into a short strip with a width of 15 mm and a length of 10 cm. One tip of the short strip was fixed, and the other tip, which was free, was bent by 180° toward the fixed tip. After that, force was released, and presence or absence of cracks was observed. The results are shown in Table 2.

Examples 2 and 3

Monolayer films and a multilayer structure were obtained by operations similar to those of Example 1, except that in (1) above, the proportions by mass of the ethylene-vinyl alcohol copolymer (A) and the acid-modified ethylene-α-olefin copolymer (B) were changed as shown in Table 2, and the various types of evaluation were performed. The results are shown in Table 2.

Example 4

Monolayer films and a multilayer structure were obtained by operations similar to those of Example 1, except that in (1) above, the acid-modified ethylene-α-olefin copolymer (B) was replaced with (B-2), and the various types of evaluation were performed. The results are shown in Table 2.

Example 5

Monolayer films and a multilayer structure were obtained by operations similar to those of Example 1, except that in (5) above, the PA (a-1) was replaced with the ETFE (a-2) and a multilayer structure of a multilayer film (layer (Y)/layer (Ad)/layer (X)/layer (Ad)/layer (Y)=ETFE/adhesive resin/EVOH/adhesive resin/ETFE=thickness 350 μm/75 μm/150 μm/75 μm/350 μm; total thickness of the total layers: 1,000 μm) was obtained, and the various types of evaluation were performed. As the adhesive resin, "Fluon AH-2000" (modified ethylene-tetrafluoroethylene copolymer (ETFE), manufactured by AGC) was used. The results are shown in Table 2.

Example 6

Monolayer films and a multilayer structure were obtained by operations similar to those of Example 1, except that in (1) above, the proportion by mass of the acid-modified ethylene-α-olefin copolymer (B) was changed as shown in Table 2 and 5 parts by mass of (b-2) was added as an other resin, and the various types of evaluation were performed. The results are shown in Table 2.

Comparative Example 1

Monolayer films and a multilayer sheet were obtained by operations similar to those of Example 1, except that in (1) above, the acid-modified ethylene-α-olefin copolymer (B) was not used, and the various types of evaluation were performed. The results are shown in Table 3.

Comparative Example 2

Monolayer films and a multilayer structure were obtained by operations similar to those of Example 1, except that in (1) above, the acid-modified ethylene-α-olefin copolymer (B) was replaced with (b-1), and the various types of evaluation were performed. The results are shown in Table 3.

Comparative Example 3

Monolayer films and a multilayer structure were obtained by operations similar to those of Example 1, except that in (1) above, the acid-modified ethylene-α-olefin copolymer (B) was replaced with (b-2), which is an unmodified ethylene-α-olefin copolymer, and the various types of evaluation were performed. The results are shown in Table 3.

Comparative Example 4

Monolayer films and a multilayer structure were obtained by operations similar to those of Example 1, except that in (1) above, the ethylene-vinyl alcohol copolymer (A) was replaced with the PA (a-1), and the various types of evaluation were performed. The results are shown in Table 3.

Comparative Examples 5 and 6

Monolayer films and a multilayer structure were obtained by operations similar to those of Example 1, except that in (1) above, the proportions by mass of the ethylene-vinyl alcohol copolymer (A) and the acid-modified ethylene-α-olefin copolymer (B) were changed as shown in Table 3, and the various types of evaluation were performed. The results are shown in Table 3.

Comparative Examples 7 and 8

Monolayer films and a multilayer structure were obtained by operations similar to those of Example 1, except that in (5) above, the thicknesses of the layer (X) and the layer (Y) were changed as shown in Table 3, and the various types of evaluation were performed. The results are shown in Table 3.

Comparative Example 9

Monolayer films and a multilayer structure were obtained by operations similar to those of Example 1, except that in (1) above, the acid-modified ethylene-α-olefin copolymer (B) was replaced with (b-3), and the various types of evaluation were performed. The results are shown in Table 3.

TABLE 2

| | | | Unit | Example 1 | Example 2 | Example 3 | Example 4 | Example 5 | Example 6 |
|---|---|---|---|---|---|---|---|---|---|
| Resin composition (x) | EVOH (A) | type | — | A-1 | A-1 | A-1 | A-1 | A-1 | A-1 |
| | | Et | mol % | 27 | 27 | 27 | 27 | 27 | 27 |
| | | proportion by mass | parts by mass | 90 | 85 | 95 | 90 | 90 | 90 |
| | polymer (B) | type | — | B-1 | B-1 | B-1 | B-2 | B-1 | B-1 |
| | | α-olefin | — | 1-butene | 1-butene | 1-butene | propylene | 1-butene | 1-butene |
| | | acid value | mg KOH/g | 12 | 12 | 12 | 12 | 12 | 12 |
| | | proportion by mass | parts by mass | 10 | 15 | 5 | 10 | 10 | 5 |
| | other resin | type | | — | — | — | — | — | b-2 |
| | | proportion by mass | parts by mass | — | — | — | — | — | 5 |
| Multilayer structure | layer (X) | thickness | μm | 150 | 150 | 150 | 150 | 150 | 150 |
| | layer (Y) | type | — | PA | PA | PA | PA | ETFE | PA |
| | | thickness per layer | μm | 425 | 425 | 425 | 425 | 350 | 425 |
| | total layers | layer configuration | — | Y/X/Y | Y/X/Y | Y/X/Y | Y/X/Y | Y/ad/X/ad/Y | Y/X/Y |
| | | thickness | μm | 1,000 | 1,000 | 1,000 | 1,000 | 1,000 | 1,000 |

TABLE 2-continued

| | | | Unit | Example 1 | Example 2 | Example 3 | Example 4 | Example 5 | Example 6 |
|---|---|---|---|---|---|---|---|---|---|
| Evaluation of monolayer film of layer (X) | OTR (20° C., 65% RH) | | cc · 20 μm/m$^2$ · day · atm | 0.16 | 0.18 | 0.15 | 0.16 | 0.16 | 0.18 |
| | yield stress | 50 μm | MPa | 33 | 31 | 37 | 34 | 33 | 35 |
| | | 100 μm | MPa | 45 | 41 | 51 | 46 | 45 | 46 |
| | | 150 μm | MPa | 47 | 44 | 55 | 49 | 47 | 48 |
| | residual stress at 15 sec | 50 μm | MPa | 12 | 11 | 13 | 12 | 12 | 13 |
| | | 100 μm | MPa | 19 | 17 | 22 | 20 | 19 | 18 |
| | | 150 μm | MPa | 21 | 20 | 24 | 22 | 21 | 19 |
| Evaluation of multilayer structure | OTR (20° C., 65% RH) | | cc/m$^2$ · day · atm | 0.02 | 0.02 | 0.02 | 0.02 | 0.02 | 0.02 |
| | presence or absence of cracks | | — | absent | absent | absent | absent | absent | absent |

TABLE 3

| | | | Unit | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 |
|---|---|---|---|---|---|---|---|---|---|---|---|---|
| Resin composition (x) | EVOH (A) | type | — | A-1 | A-1 | A-1 | a-1 | A-1 | A-1 | A-1 | A-1 | A-1 |
| | | Et | mol % | 27 | 27 | 27 | — | 27 | 27 | 27 | 27 | 27 |
| | | proportion by mass | parts by mass | 100 | 90 | 90 | 90 | 80 | 70 | 90 | 90 | 90 |
| | polymer (B) | type | — | — | b-1 | b-2 | B-1 | B-1 | B-1 | B-1 | B-1 | b-3 |
| | | α-olefin | — | — | 1-butene | 1-butene | 1-butene | 1-butene | 1-butene | 1-butene | 1-butene | * |
| | | acid value | mg KOH/g | — | 6 | — | 12 | 12 | 12 | 12 | 12 | 42 |
| | | proportion by mass | parts by mass | — | 10 | 10 | 10 | 20 | 30 | 10 | 10 | 10 |
| | other resin | type | — | — | — | — | — | — | — | — | — | — |
| | | proportion by mass | parts by mass | — | — | — | — | — | — | — | — | — |
| Multilayer structure | layer (X) | thickness | µm | 150 | 150 | 150 | 150 | 150 | 150 | 20 | 50 | 150 |
| | | type | — | PA | PA | PA | PA | PA | PA | PA | PA | PA |
| | layer (Y) | thickness per layer | µm<br>— | 425 | 425 | 425 | 425 | 425 | 425 | 490 | 175 | 425 |
| | total layers | layer configuration | — | Y/X/Y | Y/X/Y | Y/X/Y | Y/X/Y | Y/X/Y | Y/X/Y | Y/X/Y | Y/X/Y | Y/X/Y |
| | | thickness | µm | 1,000 | 1,000 | 1,000 | 1,000 | 1,000 | 1,000 | 1,000 | 400 | 1,000 |
| Evaluation of monolayer film of layer (X) | OTR (20° C., 65% RH) | | cc · 20 µm/ $m^2$ · day · atm | 0.13 | 0.16 | 0.24 | 60 | 0.21 | 0.31 | 0.16 | 0.16 | 0.16 |
| | yield stress | 50 µm | MPa | 42 | 36 | 38 | 54 | 29 | 26 | 33 | 33 | 39 |
| | | 100 µm | MPa | 62 | 49 | 51 | 68 | 39 | 33 | 45 | 45 | 49 |
| | | 150 µm | MPa | 65 | 51 | 54 | 76 | 41 | 35 | 47 | 47 | 54 |
| | residual stress at 15 sec | 50 µm | MPa | 14 | 13 | 13 | 18 | 10 | 8 | 12 | 12 | 13 |
| | | 100 µm | MPa | 25 | 21 | 22 | 28 | 13 | 11 | 19 | 19 | 21 |
| | | 150 µm | MPa | broken | 23 | 25 | broken | 16 | 15 | 21 | 21 | 23 |
| Evaluation of structure | OTR (20° C., 65% RH) | | cc/$m^2$ · day · atm | 0.02 | 0.02 | 0.04 | 8.00 | 0.04 | 0.05 | 0.16 | 0.06 | 0.02 |
| multilayer | presence or absence of cracks | | — | present | present | present | present | absent | absent | absent | absent | present |

* Random ethylene copolymer

As shown in Table 2, with regard to the multilayer structures of Examples 1 to 6, it is found that the OTR is low, the gas barrier properties are superior, and occurrence of cracks at the time of deforming by heating is inhibited. It is to be noted that the monolayer films of the layer (X) used in Examples 1 to 6 have relatively low yield stress and residual stress, which is presumed to be a factor that increases the crack resistance.

On the other hand, as shown in Table 3, in the multilayer structure of each of: Comparative Example 1, in which the polymer (B) was not used; Comparative Examples 2 and 3, in which the polymer having a low acid value or the unmodified polymer was used instead of the polymer (B); Comparative Example 4, in which the PA was used instead of the EVOH (A); and Comparative Example 9, in which the polymer having a high acid value was used instead of the polymer (B), cracks were likely to occur. Furthermore, with regard to the multilayer structure of each of: Comparative Example 4, in which the PA was used instead of the EVOH (A); Comparative Examples 5 and 6, in which the proportion by mass of the EVOH (A) was low; Comparative Example 7, in which the layer (X) was thin; Comparative Example 8, in which the thickness of the entire multilayer structure was low; and the like, the gas barrier properties were insufficient. Furthermore, cracks did not occur in Comparative Example 8, in which the thickness of the entire multilayer structure was low, and thus it is found that the problem of likelihood of occurrence of cracks at the time of deforming by heating arises significantly in the case in which the multilayer structure is thick.

INDUSTRIAL APPLICABILITY

The multilayer structure of the present invention can be used for various purposes such as containers, tubes, packaging materials, and the like, and can be particularly suitably used for automobile components (for example, filler pipes and the like).

EXPLANATION OF THE REFERENCE SYMBOLS

| | |
|---|---|
| 11 | Fuel tank |
| 12 | Mounting pipe |
| 13 | Filler pipe |
| 14 | Fuel filler pipe |

The invention claimed is:

1. A multilayer tube comprising a multilayer structure comprising at least a layer (X) constituted from a resin composition (x), the resin composition (x) comprising: an ethylene-vinyl alcohol copolymer (A); and an acid-modified ethylene-α-olefin copolymer (B), wherein a number of total layers of the multilayer structure is 3 or more, wherein:

a total thickness of the total layers is 500 μm or more, and a thickness of the layer (X) is 30 μm or more, a mass ratio (B/A) of the acid-modified ethylene-α-olefin copolymer (B) to the ethylene-vinyl alcohol copolymer (A) is 3/97 or more and 15/85 or less, and an acid value of the acid-modified ethylene-α-olefin copolymer (B) is 8.5 mg KOH/g or more and 15 mg KOH/g or less, and the multilayer tube comprises a filler pipe.

2. The multilayer tube according to claim 1, wherein a resin component of the resin composition (x) is constituted substantially from only the ethylene-vinyl alcohol copolymer (A) and the acid-modified ethylene-α-olefin copolymer (B).

3. The multilayer tube according to claim 1, wherein an ethylene unit content of an ethylene-vinyl alcohol polymer is 15 mol % or more and 35 mol % or less.

4. The multilayer tube according to claim 1, wherein an α-olefin constituting the acid-modified ethylene-α-olefin copolymer (B) is 1-butene.

5. The multilayer tube according to claim 1, wherein the resin composition (x) further comprises an antioxidant.

6. The multilayer tube according to claim 1, further comprising a layer (Y) comprising at least one resin selected from the group consisting of a polyamide, an ethylene-tetrafluoroethylene copolymer, and polyethylene.

7. The multilayer tube according to claim 6, wherein the layer (Y) is an innermost layer.

8. The multilayer tube according to claim 1, further comprising a layer (Y) comprising an ethylene-tetrafluoroethylene copolymer.

9. The multilayer tube according to claim 6, wherein the layer (Y) has a thickness from 200 to 3,000 μm.

10. The multilayer tube according to claim 1, wherein the acid value of the acid-modified ethylene-α-olefin copolymer (B) is 12 mg KOH/g.

11. The multilayer tube according to claim 1, wherein the resin composition (x) further comprises an antioxidant selected from the group consisting of 2,5-di-t-butyl-hydroquinone, 2,6-di-t-butyl-p-cresol, 4,4'-thiobis-(6-t-butylphenol), 2,2'-methylene-bis-(4-methyl-6-t-butylphenol), octadecyl-3-(3',5'-di-t-butyl-4'-hydroxyphenyl)propionate, 4,4'-thiobis-(6-t-butylphenol), pentaerythritol tetrakis[3-(3,5-di-tert-butyl-4-hydroxyphenyl)propionate], and N,N'-hexane-1,6-diylbis[3-(3,5-di-tert-butyl-4-hydroxyphenyl) propionamide].

12. The multilayer tube according to claim 1, wherein the resin composition (x) further comprises N,N'-hexane-1,6-diylbis[3-(3,5-di-tert-butyl-4-hydroxyphenyl)propionamide].

13. The multilayer tube according to claim 5, wherein a content of the antioxidant is from 0.001 to 4% by mass.

* * * * *